July 20, 1965  J. C. COLLINS  3,195,249
DUAL BLADE IMPLEMENT
Filed June 10, 1963  3 Sheets-Sheet 1
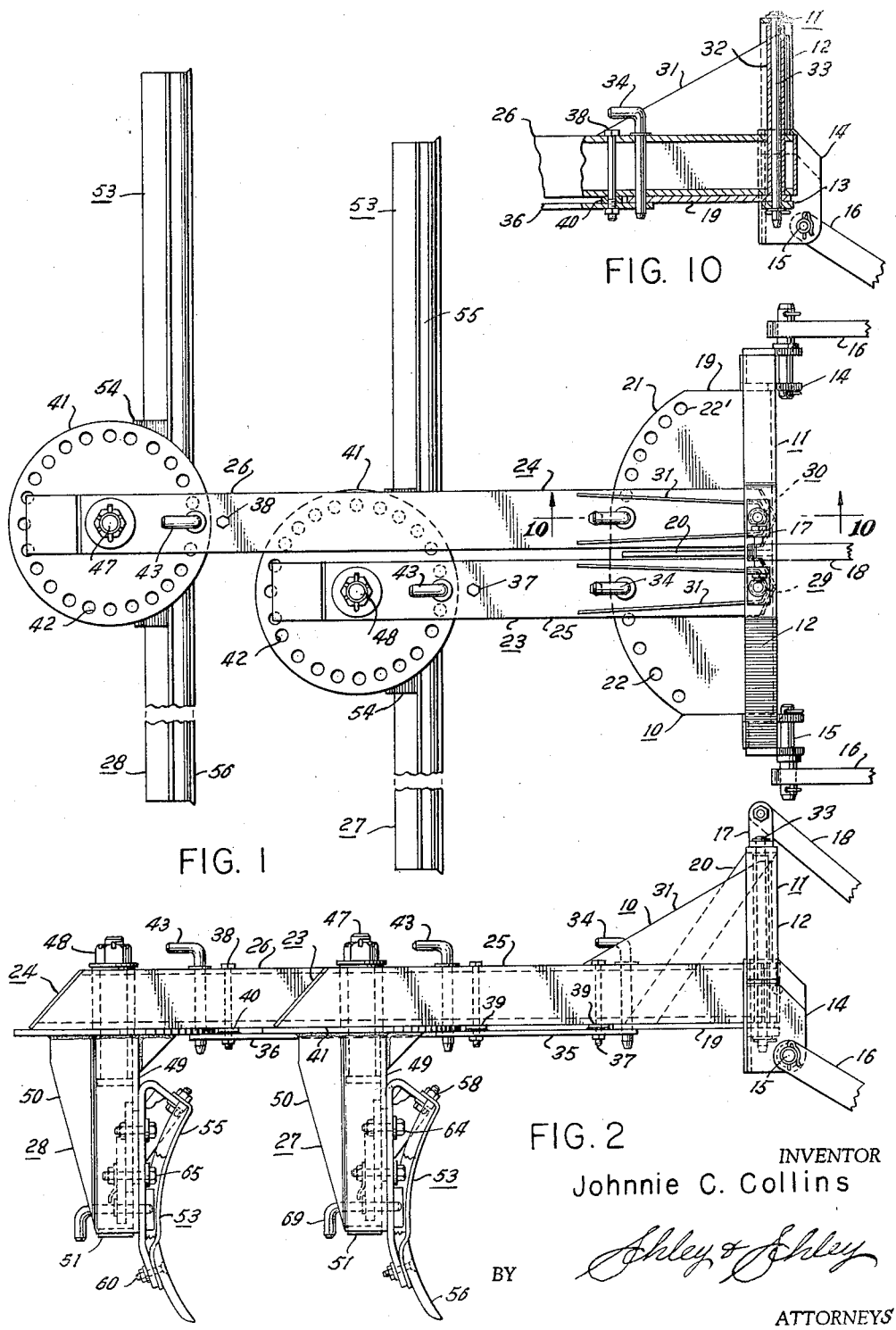
INVENTOR
Johnnie C. Collins
BY
Ehley & Ehley
ATTORNEYS July 20, 1965
J. C. COLLINS
3,195,249
DUAL BLADE IMPLEMENT
Filed June 10, 1963
3 Sheets-Sheet 2
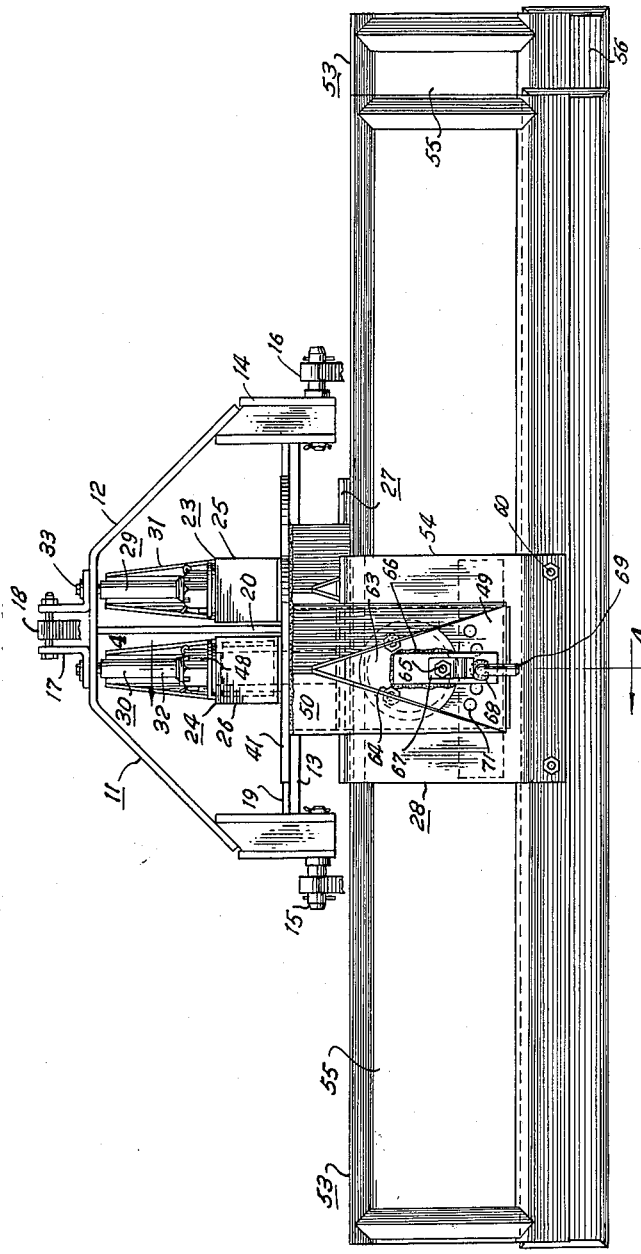
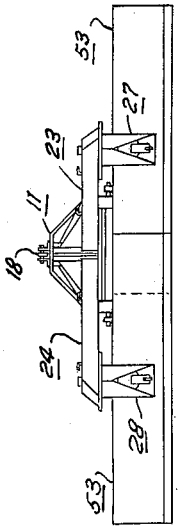
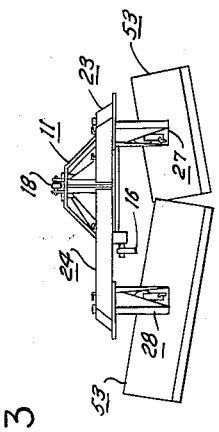
INVENTOR
Johnnie C. Collins
BY
ATTORNEYS July 20, 1965

J. C. COLLINS 3,195,249

DUAL BLADE IMPLEMENT

Filed June 10, 1963

3 Sheets-Sheet 3

INVENTOR
Johnnie C. Collins

BY *Ashley & Ashley*

ATTORNEYS

United States Patent Office 3,195,249
Patented July 20, 1965

3,195,249
DUAL BLADE IMPLEMENT
Johnnie C. Collins, Dallas, Tex., assignor to Servis Equipment Company, Dallas, Tex., a corporation of Texas
Filed June 10, 1963, Ser. No. 286,613
5 Claims. (Cl. 37—143)

This invention relates to new and useful improvements in dual blade implements for ditching, backfilling, leveling and similar material moving operations.

The invention involves the provision of a novel implement for mounting on a tractor and having a pair of blade units which are adapted to coact in ditching, backfilling, leveling and other similar moving of earth or loose material, such as gravel, sand and/or snow. Each blade unit includes a main frame having a blade suspended therefrom for pivotal movement about upright and horizontal axes, and the main frames are mounted on a common support for pivotal movement about adjacent upright axes toward and away from each other whereby the blades may undergo substantially universal adjustment relative to each other. One of the frames is longer than the other whereby the blades are offset to minimize interference with adjustments of the positions thereof, such adjustments including but not limited to parallel relationship of said blades at various angles to the direction of travel, forward and rearward convergence of said blades and inward and outward tilting of said blades. These adjustments of the blades permit the cutting of V-shaped ditches, building of center ridges, filling of ditches, grading, leveling and removal of snow and other loose material over a relatively wide width.

A construction designed to carry out the invention will be hereinafter described, together with other features of the invention.

Figure 4:
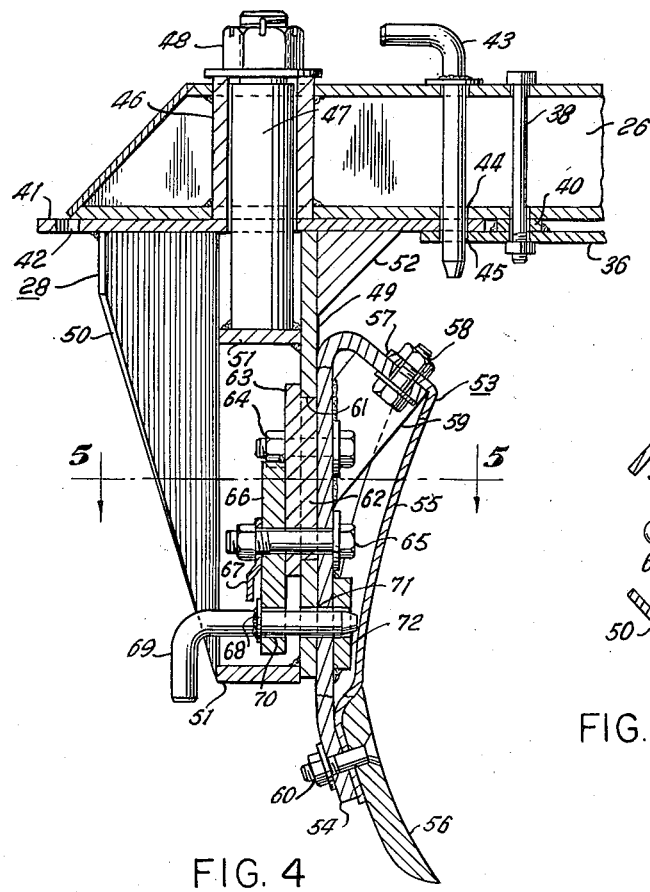
Figure 5:
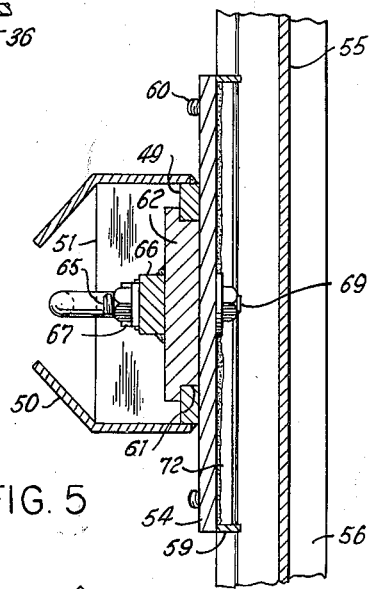
Figure 7:
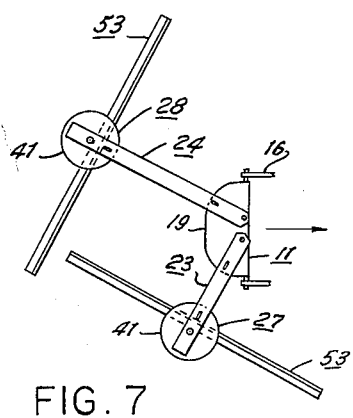
Figure 6:
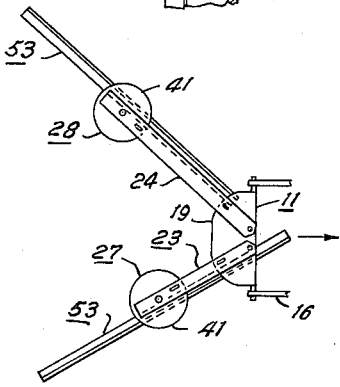

The invention will be more readily understood from a reading of the following specification and by reference to the accompanying drawings, wherein an example of the invention is shown, and wherein:

FIG. 1 is a plan view of a dual blade implement constructed in accordance with the invention, FIG. 2 is a side elevational view of the implement, FIG. 3 is a rear elevational view of the implement, FIG. 4 is an enlarged, vertical, sectional view, taken on the line 4—4 of FIG. 3, showing the mounting of one of the blades, FIG. 5 is a horizontal, cross-sectional view taken on the line 5—5 of FIG. 4, FIGS. 6 and 7 are schematic plan views of the blade units and blades in adjusted positions, FIGS. 8 and 9 are schematic, rear elevational views of the blade units and blades in adjusted positions, and FIG. 10 is a vertical, sectional view, taken on the line 10—10 of FIG. 1, showing the pivotal mounting of the main frame of one of the blade units.

In the drawings, the numeral 10 designates an implement embodying the principles of the invention and adapted to be attached to the power lift mechanism of a tractor (not shown) by an upright A-frame assembly 11. As shown most clearly in FIGS. 1–3, the A-frame assembly may include an inverted U-shaped member 12 having its lower ends connected to a horizontal, flat crossbar or member 13 by suitable brackets 14 which carry outwardly-projecting pivot pins 15 for connection with the lower arms 16 of the tractor lift mechanisms. Angle brackets 17 upstand medially from the member 12 for pivotal connection with the upper arm 18 of the lift mechanism. The crossbar 13 supports the overlying front margin of a flat, horizontal, index member or plate 19 which has its medial, rear portion secured to the medial portion of the member 12 by an upright, inclined brace or flat bar 20. Although the medial portion of the rear margin of the plate 19 may be parallel to its front margin, the lateral portions 21 of said rear margin are curved in arcs about upright axes adjacent the center of the A-frame assembly and have a plurality of apertures or openings 22 and 22' therein disposed in arcs about the same axes. As will be apparent, one of both of the apertures 22 and 22' is formed in each end of the medial portion of the plate rear margin for holding a pair of blade units 23 and 24 in adjacent, parallel relationship.

Each blade unit includes a main frame 25 or 26 in the form of an elongate, hollow beam or member which is rectangular in cross-section and which extends rearwardly from the crossbar 13 in overlying relation to the index plate 19. The beam 25 of the blade unit 23 is of less length than the beam 26 of the blade unit 24, the beams having blade assemblies 27 and 28 suspended from their rear end portions with the blade assembly 27 of said short beam 25 disposed forwardly of the blade assembly 28 of said long beam 26 in relatively close proximity. As shown by the numerals 29 and 30 in FIGS. 1 and 3, the front ends of the beams are pivotally mounted for movement about the upright axes of the curved plate margins 21 and apertures 22 and 22'. Each of the pivotal mountings 29 and 30 may include a U-shaped bracket 31 upstanding from the front end of each beam but with its arms or legs extending rearwardly, an upright sleeve 32 secured to and projecting through the beam and bracket adjacent its bight portion, and a pivot pin 33 extending through the sleeve as well as the A-frame member 12, plate 19 and crossbar 13 (FIG. 10). An index element or pin 34 extends removably and uprightly through each beam for engagement with one of the apertures 22 and 22' for maintaining the beam in adjusted angular positions relative to the index plate. As shown in FIG. 1, the apertures 22' of the plate 19 for coacting with the index pin 34 of the beam 26 are more closely spaced than the apertures 22 to compensate for the greater length of the beam 26 and the mounting of the blade assembly 28 a greater distance from the pivotal mounting 30 of said beam than the mounting of the blade assembly 27 from the pivotal mounting 29 of the short beam 25, whereby corresponding apertures provide the same amount of adjustment of said blade assemblies relative to their adjacent, parallel positions. For detachably confining the beams in underlying engagement with the rear portion of the index plate, elongate, flat bars 35 and 36 extend longitudinally of said beams in underlying, spaced relationship with their front ends engaging the underside of said plate and having the index pins extending therethrough (FIGS. 2 and 10). The bars 35 and 36 are attached to the beams 25 and 26 by pairs of suitable bolts and nuts 37 and 38, respectively, and are spaced from said beams by pairs of spacers 39 and 40 overlying and secured to said bars, the bar 36 being of greater length than the bar 35 due to the greater length of the beam 26.

The blade assemblies 27 and 28 may be identical and each assembly may include a circular, flat, horizontal, index member or plate 41 underlying the rear end portion of each of the beams 25 and 26. Circumferentially-spaced apertures or openings 42 are formed in the peripheral portion of the index plate 41 for receiving an upright index pin 43, similar to the pins 34 and projecting removably through alined openings 44 in the upper and lower walls of the beam. As shown most clearly in FIG. 4, the rear end of one of the bars 35 and 36 underlies a front portion of the index plate for detachably confining said plate in engagement with the underside of the beam and has the index pin 43 extending through an opening 45 therein alined with the beam openings 44. Rearwardly of the latter openings, a sleeve 46 is secured in and extends uprightly through the beam for receiving and rotatably supporting an axial shaft 47 which projects through and upstands from the index plate. The upper end of the shaft is reduced and screw threaded for receiving a retaining nut 48.

An upright, oblong member plate 49, having angular side members or plates 50 converging rearwardly from its upright margins, is secured to and depends from the index plate 41 contiguous and in front of the shaft 47. The plates 49 and 50 are connected to one another by a pair of horizontal, transverse bars 51, one of which underlies and is fastened to the lower end of the shaft and the other of which extends between the lower ends of said plates. Preferably, a gusset 52 joins the upper end portion of the front plate to the index plate and the upper ends of the side plates are secured to the underside of said index plate. Due to the foregoing arrangement, each blade assembly is pivotally suspended from its beam for movement about the axis of its upright shaft 47 and is maintained in adjusted angular positions relative to the beam by the coaction of the index plate apertures 42 and index pin 43.

A moldboard assembly 53 is supported for pivotal movement about a horizontal axis by the front plate 49 of each of the blade assemblies 27 and 28 and includes an upright, angular, index member or plate 54 in overlying engagement with the front face of said front plate and having a conventional moldboard 55 and replaceable cutting blade 56 mounted thereon (FIGS. 3–5). As shown by the numeral 57 in FIG. 4, the upper end portion of the index plate 54 is inclined downwardly and forwardly for underlying engagement with the complementary upper end portion of the moldboard 55 and attachment thereto by bolts and nuts 58. If desired, the plate portion 57 may be reinforced by suitable gussets 59. Bolts and nuts 60, similar to the bolts and nuts 58, detachably fasten the lower margin of the moldboard and the upper margin of its cutting blade 56 to the lower margin of the index plate. A circular opening 61, of relatively large diameter, is formed in the lower portion of the front plate 49 to receive the complementary element or boss 62 of a circular pivot member or plate 63 which is of greater diameter than the opening so as to overlie the rear face of said front plate and which is attached to the index plate 54 by bolts and nuts 64.

As shown by the numeral 65, one of the latter bolts is of increased length for extending through a flat arm or bar 66 which is secured to the rear face of the pivot plate 63 and depends radially therefrom. An angular retaining element or clip 67 is confined by the bolt 65 in overlying relation to the rear face of the arm 66 for coaction with the offset lateral flange or enlargement 68 of an index element or pin 69. The lower or outer end portion of the pivot plate arm has an aperture 70 for receiving the index pin 69 and registration with any one of a plurality of apertures 71 which extend through the front and index plates 49 and 54 as well as a flat reinforcing bar 72 secured to and overlying the front face of said index plate. As shown in FIG. 3, the apertures 71 are disposed in an arc about the axis of the pivot plate. Due to its offset flange 68, the index pin is confined against accidental displacement by the retaining clip 67 and may be disengaged from the apertures 69 and 71, when it is rotated so as to move the flange from beneath said clip, to permit adjustment of the angular relation of the moldboard assembly 53 relative to the plate 49 and the remainder of the blade assembly.

From the foregoing, it is readily apparent that the pivotal mountings 29 and 30 of the beams 25 and 26 permit transverse movement of the blade units 23 and 24 toward and away from each other. As shown in FIGS. 1–3, the blade units may be disposed in parallel, close proximity with the blade assemblies 27 and 28 in adjacent, parallel relation and at right angles to the direction of travel. This position of the blade assemblies is ideal for leveling operations. If it is desired to increase the effective width of the implement, the beams are swung apart so as to increase the transverse projection of the moldboard assemblies 53 (FIG. 9). The earth or other material being handled may be directed inwardly to fill low spots or ditches or to build center ridges by pivoting the blade assemblies about the axes of their supporting shafts 47, as shown in FIG. 7, whereby the moldboard assemblies converge rearwardly of the direction of movement. When backfilling ditches and building center ridges, it is desirable to tilt the moldbard assemblies inwardly upward by pivoting said assemblies about the axes of their pivot plates 63. As shown in FIG. 6, the blade assemblies may be positioned with their moldboard assemblies converging forwardly to direct the earth or other material outwardly. This position may also be utilized in cutting ditches by tilting the moldboard assemblies inwardly downward (FIG. 8). In addition, one or both of the blade units may be swung to one side with the blade assemblies parallel or in other angular relation to each other and at various angular relations to the direction of travel. Since each moldboard assembly is independently adjustable about a pair of spaced, upright axes as well as about a horizontal axis, it is manifest that each moldboard assembly may be disposed in any desired position and that varied operations may be performed by the implement.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A dual blade implement including a pair of blade units, a common support for the blade units, each blade unit having an elongate frame member extending rearwardly from the common support, pivot means rotatably mounting the front end of each frame member on said support for pivotal movement about an upright axis independently of the other frame member, the pivot means being in close proximity to each other to permit positioning of the frame members in adjacent parallel relationship, separate means for fastening each frame member to said support in adjusted positions to permit independent adjustments of the positions of the blade units, a blade assembly adjustably fastened and rotatably mounted on the rear end portion of each frame member for pivotal movement about an upright axis spaced from the axis of rotation of the frame member, one of the frame members being of sufficiently greater length than the other of said frame members to position the blade assemblies in spaced proximity for coaction with each other, and a moldboard assembly mounted on each blade assembly for pivotal movement therewith relative to its frame member and with the frame member relative to the other frame member.

2. A dual blade implement as set forth in claim 1 wherein each moldboard assembly is adjustably fastened and rotatably mounted on each blade assembly for pivotal movement about a substantially horizontal axis.

3. A dual blade implement as set forth in claim 1 including an upright member mounted on each blade assembly so as to depend below each frame member, an upright member at the medial portion of each moldboard assembly, one of the upright members having a circular transverse opening therein, means on the other of said members complementary to and rotatably confined in the opening so as to connect the moldboard assembly to the blade assembly for pivotal movement about a substantially horizontal axis, and means for fastening said members to each other in adjusted positions of said moldboard assembly.

4. A dual blade implement as set forth in claim 3 wherein the complementary and rotatably confined means includes an element overlying the circular transverse opening and having a circular portion complementary to said opening and confined therein in engagement with the upright member to which the element is attached.

5. A dual blade implement as set forth in claim 3 wherein the means for fastening the upright members in adjusted positions includes a fastener carried by the complementary and rotatably confined means, and means on the upright member in which the opening is formed and disposed in an arc about the substantially horizontal axis of movement of the moldboard assembly and its attached upright member for coacting with the fastener.

References Cited by the Examiner

UNITED STATES PATENTS

| | | | |
|---|---|---|---|
| 1,056,930 | 3/13 | Newell | 37—156 |
| 1,196,965 | 9/16 | Moats | 37—156 |
| 1,592,304 | 7/26 | Keyes | 37—144 |
| 2,740,214 | 4/56 | Collins | 37—156 |
| 2,787,847 | 4/57 | Arps | 37—159 |
| 2,822,628 | 2/58 | Arps | 37—159 |
| 2,943,407 | 7/60 | Long | 37—177 X |
| 2,994,138 | 8/61 | Fourlan | 37—42 |
| 3,028,692 | 4/62 | Brock | 37—42 |

FOREIGN PATENTS 203,667  9/56  Australia.

T. GRAHAM CARVER, *Primary Examiner.*

BENJAMIN HERSH, *Examiner.*